June 26, 1934.　　　　　F. C. FRANK　　　　　1,964,148
BRAKE
Filed June 16, 1930　　　2 Sheets-Sheet 1

INVENTOR.
FREDERICK C. FRANK
BY
ATTORNEY

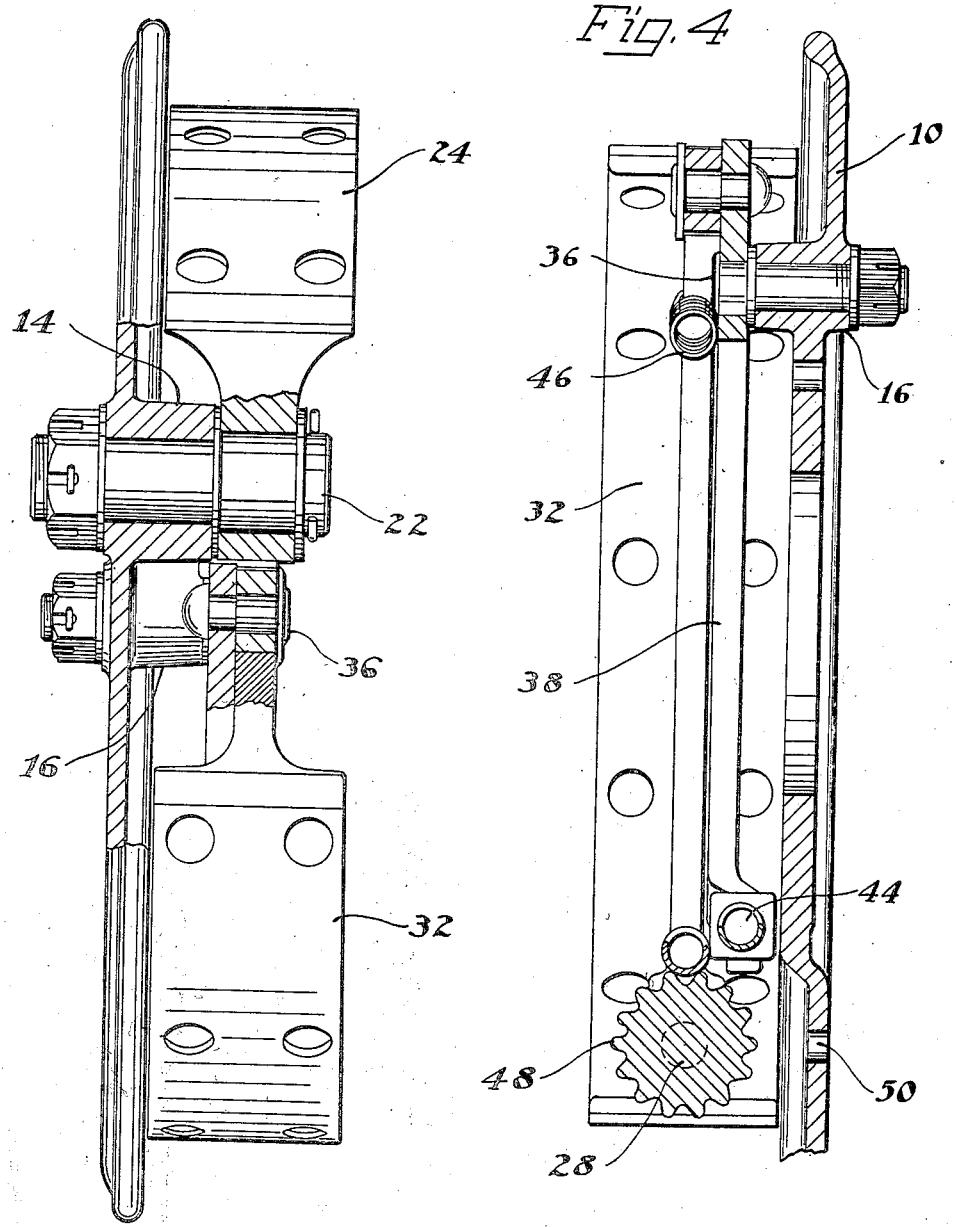

Patented June 26, 1934

1,964,148

UNITED STATES PATENT OFFICE 1,964,148

BRAKE

Frederick C. Frank, South Bend, Ind., assignor to Bendix Brake Company, South Bend, Ind., a corporation of Illinois Application June 16, 1930, Serial No. 461,341

1 Claim. (Cl. 188—78)

This invention relates to brakes and more particularly to internal expanding brakes.

The invention broadly comprehends a very simple and effective operating means for a brake designed to eliminate to a large degree the principal errors in brake operating structures. It is the aim of the present invention to attain the desired mechanical advantage of the operating means with the least possible loss of energy due to friction, lost motion and other causes.

An object of the invention is to provide an efficient operating member for the friction element of a brake.

Another object of the invention is to provide an operating lever for the friction element of a brake wherein increased leverage may be obtained.

A further object of the invention is to provide an operating lever for the friction elements of a brake which will give the desired applying force and to so construct and arrange the friction elements that an increased braking surface may be obtained.

A further object of the invention is to provide a simple and effective adjusting member for the friction elements of a brake.

Other objects of the invention will appear from the following description taken in connection with the drawings, which form a part of this specification, and in which:

Figure 3 is a sectional view substantially on line 3—3, Figure 1; and

Figure 4 is a sectional view substantially on line 4—4, Figure 1.

Figure 1:
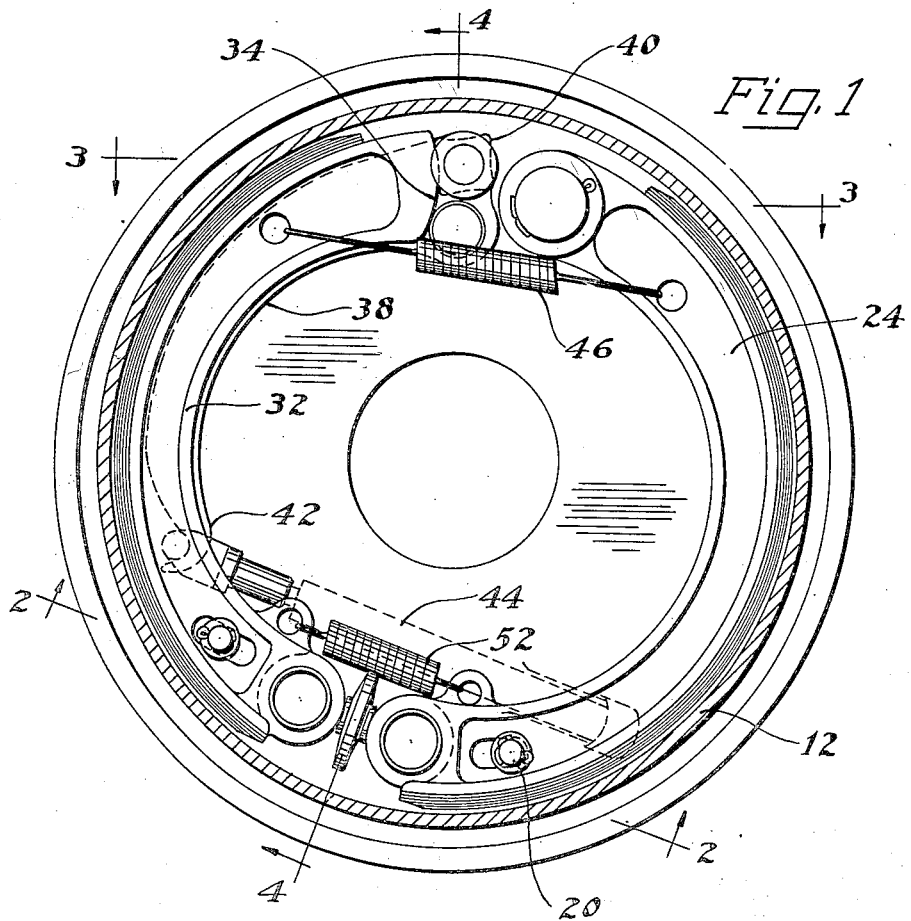
Figure 1 is a vertical sectional view of a brake taken immediately back of the head of the drum showing the friction elements in elevation and illustrating the invention as applied.
Figure 2:
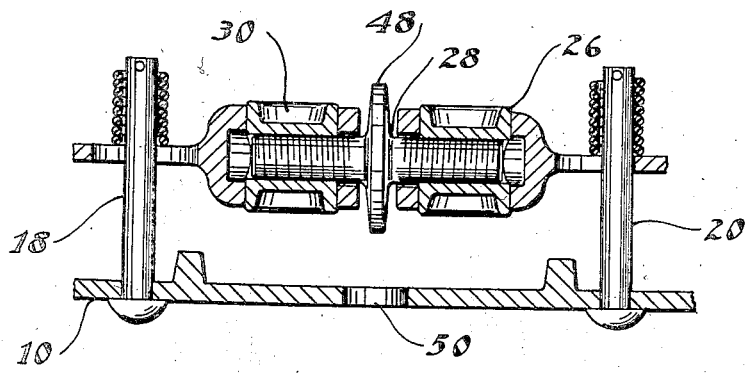
Figure 2 is a sectional view substantially on line 2—2, Figure 1.

Referring to the drawings for more specific details of the invention, 10 represents a fixed support such as a backing plate having associated therewith a rotatable drum 12. This drum may be secured in any desirable manner to a rotatable member such as a wheel. The backing plate has positioned thereon suitable bosses 14 and 16 and steady rests 18 and 20. The bosses 14 and 16 are preferably formed integral with the backing plate.

As shown, the boss 14 is bored to receive an anchor 22 to which is pivoted a secondary shoe 24. This shoe is slotted to receive the steady rest 20 and is provided with a bifurcated end. A nut 26 is rotatably mounted transversely of the bifurcated end and threaded into the nut is one end of a screw 28. The other end of the screw is threaded in a nut 30 positioned for rotation transversely of a bifurcated end on a primary shoe 32. This shoe is slotted to receive the steady rest 18 and is provided with a curved shoulder 34. The secondary shoe has a greater arc or length than the primary shoe, so that increased braking surface may be obtained.

The boss 16 is bored to receive a pin 36 on which is pivoted a lever 38. This lever is positioned between the web of the primary shoe and the backing plate. The fulcrum end of the lever has pivotally secured thereto a block 40 provided with curved faces adaptable for engagement with the shoulder 34 on the primary shoe. As shown, the lever is arcuate and has a substantial length so that an increased applying force may be obtained and the force applying end of the lever is provided with a hook 42 to which is attached a control cable 44 extending through the backing plate.

The primary and secondary shoes are connected by a spring 46 adapted to return the shoes to the off position and to retain them when in the off position in proper spaced relation to the drum.

The adjusting screw 28 is provided with a toothed or ratchet wheel 48 readily accessible through an opening 50 in the backing plate and connected between the primary and secondary shoes is a spring 52 engaging the ratchet to retain the screw in adjusted position. It will, of course, be understood that the screw 28 is reversely threaded, so that upon rotation thereof, the shoes may be adjusted with relation to each other.

Although this invention has been described in connection with certain specific embodiments, the principles involved are susceptible of numerous other applications that will readily occur to persons skilled in the art. The invention is, therefore, to be limited only as indicated by the scope of the appended claim.

Having thus described the various features of the invention, what I claim as new and desire to secure by Letters Patent is:

A brake comprising a fixed support, a rotatable drum associated therewith, an anchor on the fixed support, a friction element pivoted on the anchor and adaptable for co-operation with the drum, an operating lever pivoted adjacent to the anchor, a short arm on the operating lever, means on the arm engaging the toe of the friction element, a long arm on the operating member positioned between the web of the friction element and the fixed support and an operating cable connected to the force applying end of the lever.

FREDERICK C. FRANK.